United States Patent
Yeum

(10) Patent No.: US 9,982,833 B2
(45) Date of Patent: May 29, 2018

(54) INSPECTION APPARATUS

(71) Applicant: HYUNDAI MOTOR COMPANY, Seoul (KR)

(72) Inventor: Jung Whan Yeum, Chungcheongbuk-do (KR)

(73) Assignee: Hyundai Motor Company, Seoul (KR)

( * ) Notice: Subject to any disclaimer, the term of this patent is extended or adjusted under 35 U.S.C. 154(b) by 290 days.

(21) Appl. No.: 14/936,016

(22) Filed: Nov. 9, 2015

(65) Prior Publication Data

US 2016/0356631 A1 Dec. 8, 2016

(30) Foreign Application Priority Data

Jun. 8, 2015 (KR) .................. 10-2015-0080579

(51) Int. Cl.
| | | |
|---|---|---|
| *G01N 21/86* | (2006.01) | |
| *F16M 11/18* | (2006.01) | |
| *F16M 11/04* | (2006.01) | |
| *F16M 11/20* | (2006.01) | |
| *F16M 11/42* | (2006.01) | |

(52) U.S. Cl.
CPC ........... *F16M 11/18* (2013.01); *F16M 11/046* (2013.01); *F16M 11/2085* (2013.01); *F16M 11/2092* (2013.01); *F16M 11/425* (2013.01); *F16M 2200/08* (2013.01)

(58) Field of Classification Search
CPC ............................ G01B 11/022; G01R 31/311
See application file for complete search history.

(56) References Cited

U.S. PATENT DOCUMENTS

| | | | | |
|---|---|---|---|---|
| 4,028,728 A * | 6/1977 | Sharp | .................. | G01B 11/022 250/225 |
| 5,119,543 A * | 6/1992 | Reilly | .................... | B60G 5/053 280/124.17 |
| 5,600,150 A * | 2/1997 | Stern | .................... | G01B 11/022 250/559.29 |
| 5,818,061 A * | 10/1998 | Stern | .................... | G01B 11/022 250/559.29 |
| 6,878,341 B2 * | 4/2005 | Kowallis | ............... | B01L 3/5085 422/500 |
| 7,988,817 B2 * | 8/2011 | Son | .................. | H01L 21/68742 118/728 |
| 2012/0145849 A1 | 6/2012 | Yeum | | |
| 2014/0139659 A1 | 5/2014 | Lim et al. | | |

FOREIGN PATENT DOCUMENTS

| | | |
|---|---|---|
| JP | H06-123110 A | 5/1994 |
| JP | 2006-308500 A | 11/2006 |
| JP | 2008-043964 A | 2/2008 |
| KR | 10-2010-0078732 A | 7/2010 |
| KR | 10-2011-0098358 A | 9/2011 |
| KR | 10-2012-0089875 A | 8/2012 |
| KR | 10-2014-0065580 A | 5/2014 |
| KR | 10-1439005 B1 | 9/2014 |

OTHER PUBLICATIONS

Korean Notice of Allowance issued in Application No. 10-2015-0080579 dated Jan. 13, 2017, with English translation.

* cited by examiner

*Primary Examiner* — Amy J. Sterling
(74) *Attorney, Agent, or Firm* — McDermott Will & Emery LLP

(57) ABSTRACT

An inspection apparatus includes an inspection unit for inspecting an inspection target, and a positioning unit for supporting the inspection target and positioning the inspection target to an inspection position.

11 Claims, 5 Drawing Sheets

INSPECTION APPARATUS

CROSS-REFERENCE TO RELATED APPLICATION

This application claims the benefit of priority to Korean Patent Application No. 10-2015-0080579, filed on Jun. 8, 2015 with the Korean Intellectual Property Office, the disclosure of which is incorporated herein in its entirety by reference.

TECHNICAL FIELD

The present disclosure relates to an inspection apparatus and, more particularly, to an inspection apparatus capable of positioning an inspection target such as a component or an assembly through a simple positioning structure.

BACKGROUND

An inspection apparatus is an apparatus for inspecting a target to be inspected (or an inspection target) such as individual components or an assembly formed by assembling a plurality of components to determine whether the inspection target is defective. The inspection apparatus is configured to acquire an image of the inspection target through a camera and subsequently, precisely inspect a defect of the inspection target through the obtained image information.

For example, for an assembly formed by assembling a plurality of panels or components, like a door assembly for a vehicle, quality of an outer appearance thereof is an important factor, and thus, it is required to precisely inspect whether the door assembly has been accurately assembled according to design drawings or references.

An inspection apparatus for inspecting a voluminous inspection target, like the door assembly for a vehicle, includes a support module supporting an assembly loaded by a robot, a positioning module positioning the assembly supported by the support module to a position appropriate for inspection, and an inspection module inspecting the positioned inspection target.

The positioning module has a plurality of regulation pins regulating a vertical position of the inspection target while moving downwardly from an upper side of the inspection target supported by the support module, a plurality of adsorption cups adsorbing a lower surface of the inspection target, and a plurality of guide bars guiding an edge of the inspection target.

However, in the related art inspection apparatus, while the plurality of regulation pins are moving downwardly from the upper side of the inspection target, if descending speeds of the regulation pins are varied, a phenomenon in which one side of the inspection target is partially raised may occur, leading to shortcomings that positioning is not precisely performed.

In addition, in the related art inspection apparatus, the lower surface of the inspection target may be supportedly adsorbed by the adsorption cups, but when the regulation pins come in contact with an upper surface of the inspection target, the inspection target may be partially deformed due to the adsorption of the adsorption cups.

Moreover, in the related art inspection apparatus, the positioning module has a complicated structure, and loading and unloading of the inspection target are intricately performed, degrading efficiency of the inspection operation.

SUMMARY OF THE DISCLOSURE

The present disclosure has been made to solve the above-mentioned problems occurring in the prior art while advantages achieved by the prior art are maintained intact.

An aspect of the present disclosure provides an inspection apparatus capable of accurately and simply positioning an inspection target such as a component or an assembly, and rapidly and stably loading or unloading a plurality of inspection targets when the plurality of inspection targets are to be inspected successively, thus significantly enhancing efficiency of the inspection operation.

According to an exemplary embodiment of the present disclosure, an inspection apparatus includes: an inspection unit for inspecting an inspection target; and a positioning unit for supporting the inspection target and positioning the inspection target to an inspection position.

The positioning unit may include a positioner for supporting a lower surface of the inspection target and positioning the inspection target to the inspection position.

The positioner may have a contact surface in contact with the lower surface of the inspection target, and a locating pin may be provided to protrude upwardly from the contact surface.

A through hole may be formed in a central portion of the contact surface of the positioner, a locating block may be provided inside of the positioner, and the locating pin may be coupled to the locating block.

A central line of the locating block may be disposed to be identical to a central line of the positioner.

A locating hole may be formed in the inspection target to allow the locating pin to be inserted therein, and the locating pin may have a first locating pin having an outer diameter equal to an inner diameter of the locating hole of the inspection target and a second locating pin having an outer diameter smaller than the inner diameter of the locating hole of the inspection target.

A central line of the first locating pin may be disposed to be identical to the central line of the locating block.

A central line of the second locating pin may be disposed to be eccentric with respect to the central line of the locating block.

The inspection apparatus may further include: a restraining unit for restraining an edge of the inspection target.

The restraining unit may have one or more restraining portions that come into contact with the edge of the inspection target.

The restraining unit may include a first restraining portion restraining the edge of the inspection target in a horizontal direction and a second restraining portion restraining the edge of the inspection target in a vertical direction.

The restraining unit may further include: a cylinder having a rod that moves forward and backward; a pivot member pivotedly installed on the rod of the cylinder; and a moving block connected to one side of the cylinder for moving the first restraining portion, wherein the first restraining portion is provided in the moving block and the second restraining portion is provided in the pivot member.

The inspection apparatus may further include: a support unit for supporting and move the positioning unit, wherein the support unit has a support member having a flat upper surface, and the support member is moved in at least one direction in order to be adjusted to a position.

According to another exemplary embodiment of the present disclosure, an inspection apparatus includes: a base; an inspection unit for inspecting an inspection target, while moving in three-axis directions on the base; a plurality of positioning units for supporting a lower surface of the inspection target and positioning the inspection target to an inspection position; and a plurality of support units for respectively moving the plurality of positioning units and supporting the plurality of positioning units, wherein the plurality of support units respectively move the plurality of positioning units in the 3-axis directions on the base.

The inspection apparatus may further include: a restraining unit for restraining an edge of the inspection target positioned by the plurality of positioning units in a horizontal direction and in a vertical direction, wherein the restraining unit is installed on the plurality of support units.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
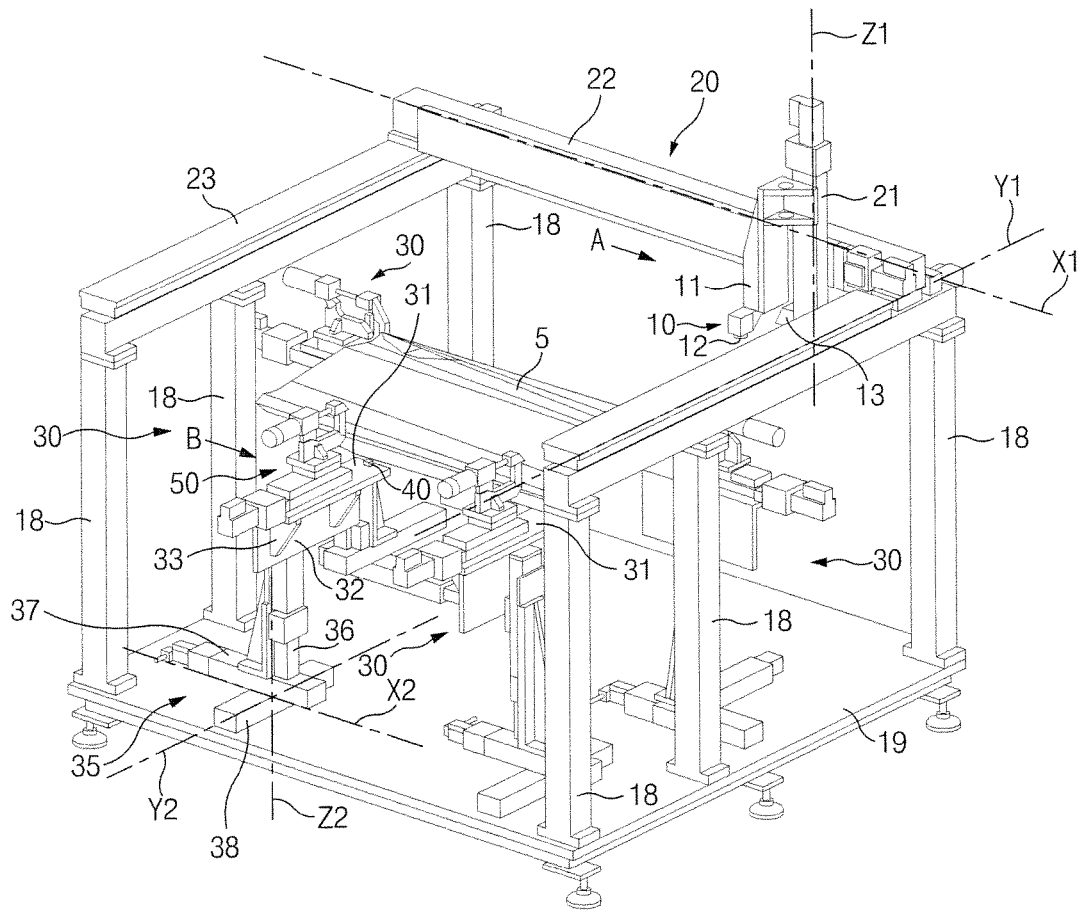
FIG. 1 is a perspective view illustrating an inspection apparatus according to an exemplary embodiment of the present disclosure.

Hereinafter, the exemplary embodiment of the present disclosure will be described in detail with reference to the accompanying drawings. For reference, dimensions of elements or thicknesses of lines illustrated in the drawings referred to describe the present disclosure may be exaggerated for the convenience of understanding. Also, the terms used henceforth have been defined in consideration of the functions of the present disclosure, and may be altered according to the intent of a user or operator, or conventional practice. Therefore, the terms should be defined on the basis of the entire content of this specification.

FIGS. 1 through 5B are views illustrating an inspection apparatus according to an exemplary embodiment of the present disclosure.

The inspection apparatus according to an exemplary embodiment of the present disclosure may include an inspection unit 10 inspecting a voluminous inspection target such as a door assembly for a vehicle, a plurality of positioning units 40 supporting an inspection target 5 and positioning the inspection target 5 at an accurate inspection position, a plurality of support units 30 respectively supporting and moving the plurality of positioning units 40, and a plurality of restraining units 50 restraining an edge of the inspection target 5 positioned in the inspection position.

The inspection unit 10 includes an inspection body 11, a light source 12 and a camera 13 installed on the inspection body 11.

Figure 2:
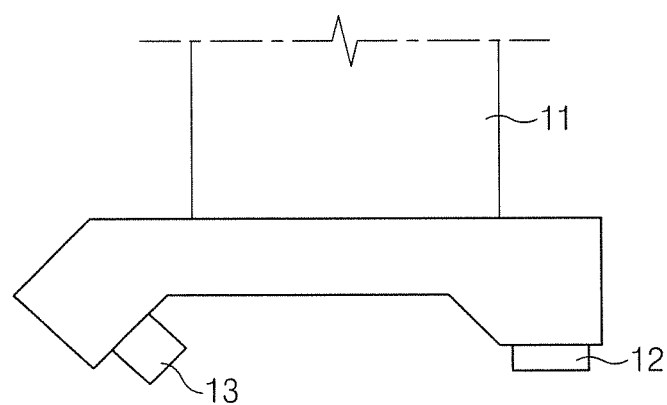
FIG. 2 illustrates a portion viewed in a direction indicated by the arrow "A" of FIG. 1.

As illustrated in FIG. 2, the light source 12 and the camera 13 are spaced apart from one another on a lower end surface of the inspection body 11, and the camera 13 is installed to be sloped at a predetermined angle with respect to a vertical line of the light source 12.

As light emitted from the light source 12 is irradiated to a surface of the inspection target 5 and the irradiated light is reflected from the surface of the inspection target 5 and incident to the camera 13, the inspection unit 10 obtains an image regarding the surface of the inspection target 5 and a controller (not shown) determines whether the inspection target 5 is defective on the basis of the obtained image information.

According to an exemplary embodiment, the light source 12 is configured as a laser emitter emitting a laser beam such as a line laser, or the like, and the camera 13 is configured as a vision camera. The laser emitter 12 forms a cross-sectional profile of the inspection target 5, and the vision camera 13 continuously images the cross-sectional profile to generate a 3D image, whereby whether the inspection target 5 is defective may be more accurately determined.

The inspection unit 10 may be moved in at least one direction, and through the movement of the inspection unit 10, the voluminous inspection target 5 may be more accurately imaged.

According to an exemplary embodiment, as illustrated in FIG. 1, the inspection unit 10 may have a structure in which the inspection unit 10 is movable in three-axis directions (X1, Y1, and Z1) by a first moving mechanism 20.

The first moving mechanism 20 has three linear guides 21, 22, and 23 installed on vertical columns 18 of a base 19, and the three linear guides 21, 22, and 23 are configured to move the inspection body 11 in three-axis directions X1, Y1, and Z1, respectively.

The linear guides 21, 22, and 23 each have a guide rail extending in a length direction and a carrier movable in the length direction on the guide rail.

Since the inspection unit 10 may be accurately moved to various parts of the voluminous inspection target 5 in the three-axis directions X1, Y1, and Z1 by the first moving mechanism 20, accurate images of the surfaces of the voluminous inspection target 5 may be obtained. Thus, whether the inspection target 5 is defective may be precisely and effectively determined.

As illustrated in FIG. 1, a plurality of support units 30 are installed to support and move the positioning units 40, respectively, and in particular, the plurality of support units 30 are disposed equally in every direction on the base 19 to strengthen a stable support of the inspection target 5 by the positioning units 40.

The support units 30 each include a support member 31 having an upper surface flat in a horizontal direction. The support member 31 is installed to be movable in at least one direction, and the inspection target 5 may be supported in a balanced manner through the movement of the support member 31.

According to an exemplary embodiment, the support member 31 is installed to be movable in three-axis directions X2, Y2, and Z2 by a second moving mechanism 35.

The second moving mechanism 35 has three linear guides 36, 37, and 38 installed on the upper surface of the base 19, and the three linear guides 36, 37, and 38 are configured to move the support member 31 in three-axis directions X2, Y2, and Z2, respectively. The linear guides 36, 37, and 38 each have a guide rail extending in a length direction and a carrier movable on the guide rail in the length direction.

In this manner, since the support member 31 is moved in the three-axis directions X2, Y2, and Z2 by the second moving mechanism 35 to correspond to various types of inspection targets 5 so as to be adjusted in position thereof, the support member 31 may compatibly support various types of inspection targets 5.

A connection member 32 is coupled to one side of the support member 31 in a direction perpendicular to the support member 31 (that is, in a vertical direction), and the second moving mechanism 35 is connected to the connection member 32. Also, a reinforcing member 33 is installed between the support member 31 and the connection member 32 to reinforce support rigidity between the support member 31 and the connection member 32.

Figure 3:
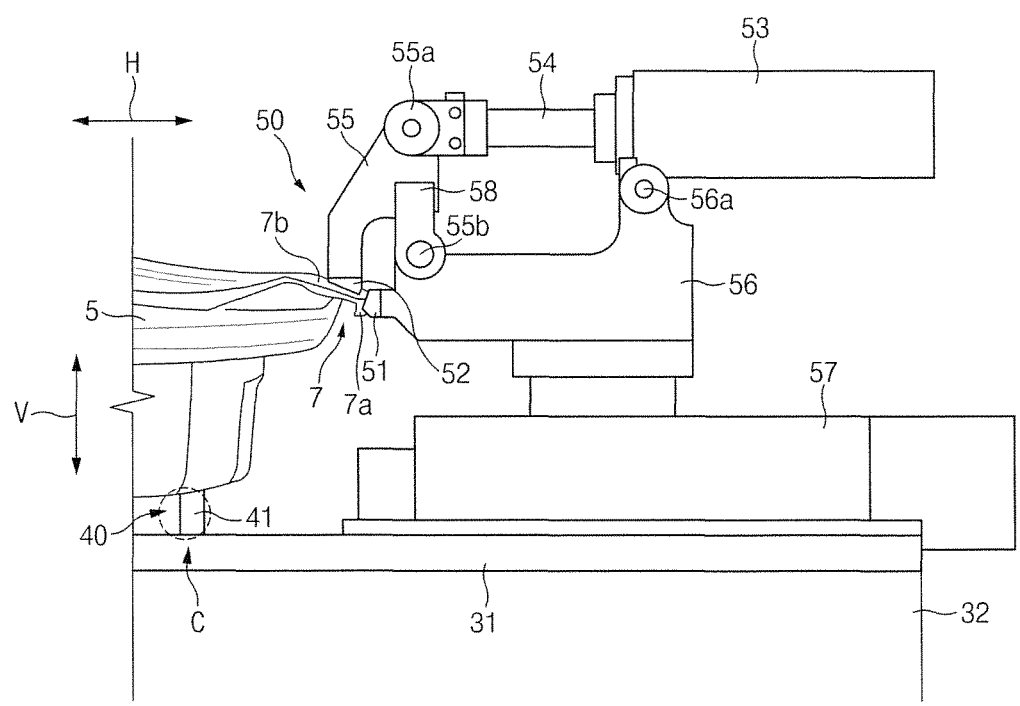
FIG. 3 illustrates a portion viewed in a direction indicated by the arrow "B" of FIG. 1, in which an edge of an inspection target is restrained by a restraining unit of the inspection apparatus according to an exemplary embodiment of the present disclosure.

As illustrated in FIGS. 3 and 5, the positioning unit 40 is provided on an upper surface of each of the support members 31 to stably support the inspection target 5 and position (i.e., determine the position of) the inspection target 5.

As illustrated in FIGS. 3 and 5, the positioning unit includes a positioner 41 provided to protrude upwardly from the upper surface of the support member 31.

Since the positioning unit 40 is installed on the upper surface of the support member 31 of the support unit 30, the positioning unit 40 has a structure supported and moved by the support unit 30. Thus, when the inspection target 5 is loaded or unloaded, a lower surface of the inspection target 5 may be stably mounted on the positioning unit 50 in a positive manner. Also, since a factor interfering with the inspection target 5 when the inspection target 5 is loaded or unloaded is removed, the inspection operation may be more simply or rapidly performed on the inspection target 5.

The positioner 41 has a contact surface 41a on an upper surface thereof in contact with a lower surface of the inspection target 5, and thus, the positioner 41 may stably support the inspection target 5 and regulate a vertical position thereof (please refer to the arrow V of FIG. 3). A through hole 42 is formed in a central portion of the contact surface 41a of the positioner 41, and a hollow portion is formed inside the positioner 41.

A plurality of locating holes 6 are formed on the lower surface of the inspection target 5, and here, the plurality of locating holes 6 are disposed on the lower surface of the inspection target 5 in a balanced way. Thus, the plurality of support units 30 and the positioning unit 40 are disposed to be adjacent to each of the locating holes 6 of the inspection target 5 to support the inspection target 5 in a balanced manner and stably maintain accurate positioning.

Locating pins 43 and 44 protruding upwardly are installed in the through hole 42 of the positioner 41. Accordingly, when the lower surface of the inspection target 5 comes into contact with the contact surface 41a of the positioner 41 due to self-load of the inspection target 5, the locating pin 43 or 44 is inserted into the locating hole 6 of the inspection target 5, effectively positioning the inspection target 5.

A lower end of each of the locating pins 43 and 44 is coupled to a locating block 45, and the locating block 45 is positioned inside the positioner 41. In particular, a central line C1 of the locating block 45 is identical to a central line of the positioner 41, making the locating block 45 and the positioner 41 have a concentric structure, and thus, the locating block 45 is used as a reference when the locating pins 43 and 44 are disposed.

In a case in which a plurality of inspection targets are intended to be inspected and the plurality of inspection targets are the same type, that is, in case of a large amount of homogeneous inspection targets 5, an inspection may be continuously performed thereon through repeated loading and unloading by the loading robot. In order to rapidly and accurately perform the continuous inspection operation, the locating pins 43 and 44 may be classified as a locating pin for an initial setting and a locating pin 44 for continuous inspection.

Figure 5A:
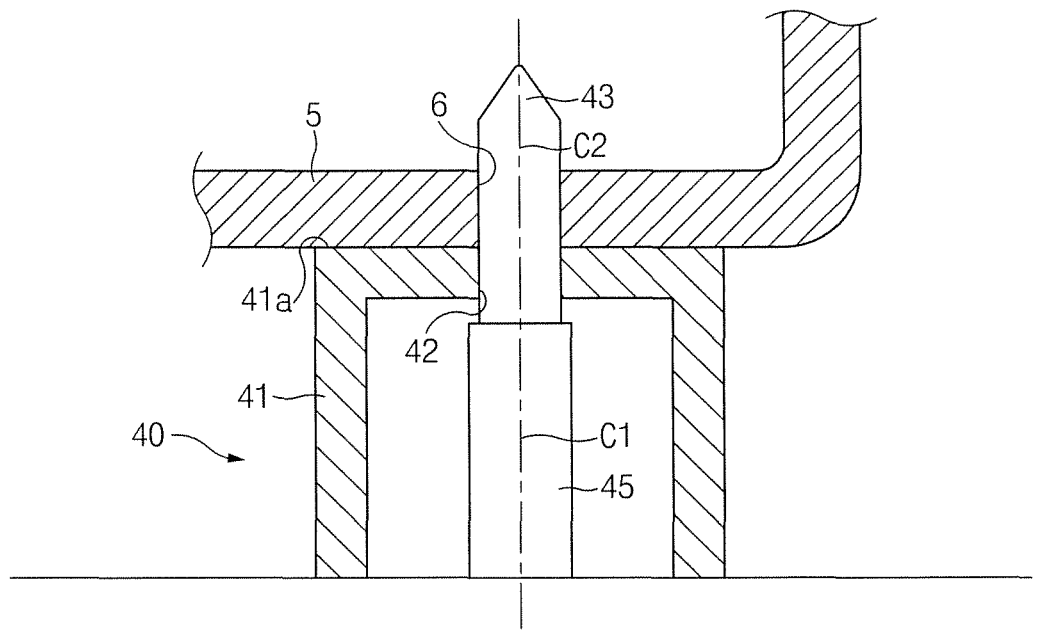
FIGS. 5A and 5B are figures showing a magnified "C" part of FIG. 3.

As illustrated in FIG. 5A, an outer diameter of the locating pin 43 for the initial setting is equal to an inner diameter of a locating hole 6 of the inspection target 5, and accordingly, a central line C2 of the locating pin 43 for the initial setting is identical to the central line C1 of the locating block 45 and the central line of the positioner 41.

Figure 5B:
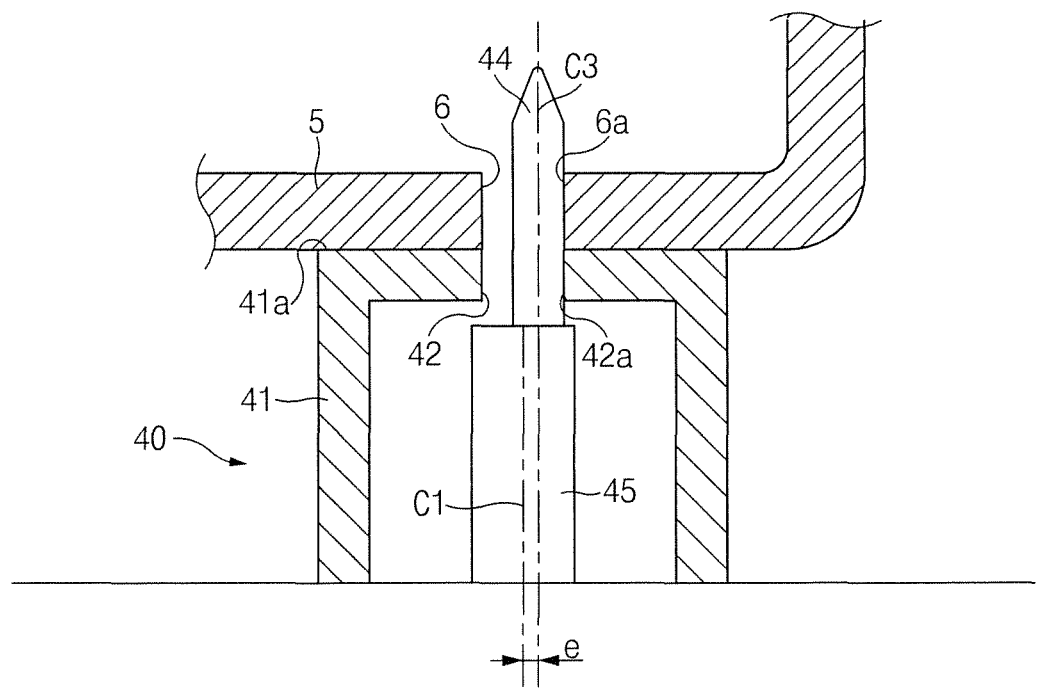

As illustrated in FIG. 5B, an outer diameter of the locating pin 44 for continuous inspection is smaller than the inner diameter of the locating hole 6 of the inspection target 5 and a central line C3 of the locating pin 44 for continuous inspection may be disposed to be eccentric with an eccentric amount e with respect to the central line C1 of the locating block 45.

In particular, preferably, the eccentric amount e between the locating pin 44 for continuous inspection and the locating block 45 is set such that the locating pin 44 for continuous inspection is maintained to be in contact with one side 6a (a portion of the inspection target 5 facing in an outward direction) of the locating hole 6. To this end, after the inner diameter of the through hole 42 of the positioner 41 and the inner diameter of the locating hole 6 are formed to be equal, the eccentric amount e is set such that the locating pin 44 for continuous inspection is maintained to be in contact with one side 42a of the through hole 42 of the positioner 41 when the locating pin 44 for continuous inspection is coupled to the locating block 45.

An inspection process based on the locating pin 43 for initial setting and the locating pin 44 for continuous inspection will be described in detail with reference to FIGS. 5(a) and 5(b).

First, in a case in which a large amount of homogeneous inspection targets 5 are intended to be inspected, when the initial setting is performed by using a first inspection target 5, the locating pin 43 for the initial setting is installed in the through hole 42 of the positioner 41 as illustrated in FIG. 5A.

Next, when the first inspection target 5 is mounted on the positioner 41, a lower surface of the inspection target 5 comes into contact with the contact surface 41a of the positioner 41 due to a self-load of the inspection target 5 and the locating pin 43 for the initial setting is inserted into the locating hole 6 of the inspection target 5. Here, since the outer diameter of the locating pin 43 for the initial setting is equal to the inner diameter of the locating hole 6 of the inspection target 5, the inspection target 5 and the support member 31 may be relatively adjusted minutely in their positions, whereby initial positions of the inspection target 5 and the support member 31 may be accurately set.

Thereafter, in a case in which another inspection target 5 of the same type is intended to be measured successively, since the outer diameter of the locating pin 43 for the initial setting is equal to the inner diameter of the locating hole 6 of the inspection target 5, frictional contact or abrasion may occur between an outer surface of the locating pin 43 for the initial setting and an inner surface of the locating hole 6 of the inspection target 5, making it difficult for the inspection target 5 to be positioned or to be stably mounted on the contact surface 41a of the positioner 41.

In order to solve the problem, in the present disclosure, after the first inspection target 5 is unloaded from the positioning unit 40, the locating pin 44 for continuous inspection is installed in the through hole 42 of the positioner 41 as illustrated in FIG. 5B.

Thereafter, when the other inspection target 5 of the same type is loaded toward the positioner 41 by the loading robot, since the outer diameter of the locating pin 44 for continuous inspection is smaller than the inner diameter of the locating hole 6, a lower surface of the inspection target 5 may be simply and rapidly mounted on the contact surface 41a of the positioner 41.

Also, when each locating pin 44 for continuous inspection is inserted into the locating hole 6 of the inspection target 5, one side of each locating pin 44 for continuous inspection is lopsidedly in contact with one side 6a of the locating hole 6 of the inspection target 5 and one side 42a of the through hole 42 of the positioner 41, and thus, each locating pin 44 for continuous inspection is in contact with one side 6a of each locating hole 6, whereby a plurality of locating pins 44 for continuous inspection may respectively support the locating holes 6 of the inspection target 5 symmetrically while accurately maintaining the inspection target 5 at the position of initial setting.

The restraining unit 50 restrains an edge 7 of the inspection target 5 positioned by the positioning unit 40, and stably supports the inspection target 5.

The restraining unit 50 includes a first restraining portion 51 restraining the edge 7 of the inspection target 5 in a horizontal direction and a second restraining portion 52 restraining the edge 7 of the inspection target 5 in a vertical direction.

The first restraining portion 51 comes into contact with a side surface 7a of the edge 7 of the inspection target 5, thus stably restraining the side surface 7a of the edge 7 of the inspection target 5.

The second restraining portion 52 comes into contact with an upper surface 7b of the edge 7 of the inspection target 5, thus stably restraining the upper surface 7b of the edge 7 of the inspection target 5.

Also, the restraining unit 50 includes a cylinder 53 having a rod 54 moving forward and backward, a pivot member 55 pivotally installed on the rod 54 of the cylinder 53, and a moving block 56 movable along a guide part 57 to adjust a position of the cylinder 53.

A body of the cylinder 53 is connected to one side of the moving block 56 by the medium of a connection pin 56a, and a pivot member 55 is pivotally installed at a front end of the rod 54 by the medium of a pivot pin 55a.

Also, a connection member 58 is fixed to one side of the pivot member 55 through welding, or the like, and an end portion of the connection member 58 is connected to one side of the moving block 56 by the medium of a connection pin 55b.

Figure 4:
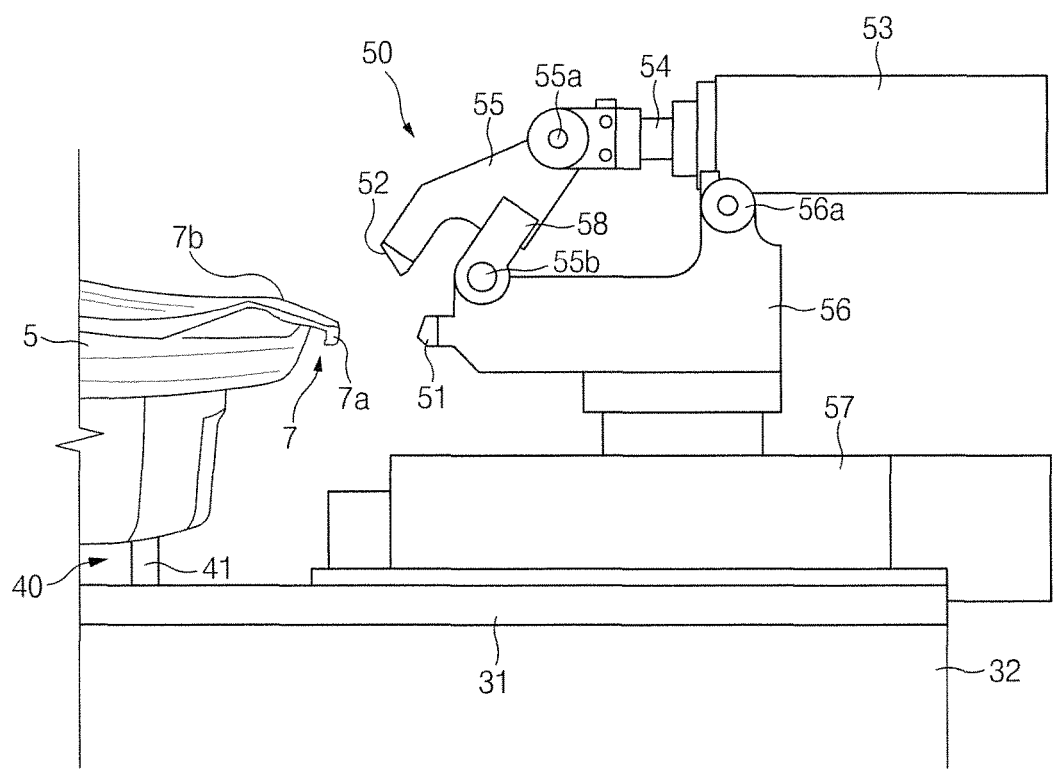
FIG. 4 is a view illustrating a state in which the edge of the inspection target is released from the state of being restrained by the restraining unit of the inspection apparatus according to an exemplary embodiment of the present disclosure.

The moving block 56 may move forward to be adjacent to the positioning unit 40 through the guide part 57 (please refer to FIG. 3) or may move backward so as to be spaced apart from the positioning unit 40 (please refer to FIG. 4).

The guide part 57 is fixed to an upper surface of the support member 31, and in particular, the guide part 57 is disposed to be adjacent to the positioning unit 40.

The second restraining portion 52 is provided at a lower end of the pivot member 55, and the first restraining portion 51 is provided at a front end of the moving block 56.

The operation of the restraining unit 50 will be described with reference to FIGS. 3 and 4.

After the inspection target 5 is positioned by the positioning unit 40, when the moving block 56 is moved forward to the edge 7 of the inspection target 5, the first restraining portion 51 comes into contact with the side surface 7a of the edge 7 of the inspection target 5, and accordingly, the edge 7 of the inspection target 5 is restrained in the horizontal direction, as illustrated in FIG. 3. Also, as the rod 54 of the cylinder 53 moves forward, the pivot member 55 is pivoted toward the edge 7 of the inspection target 5, and accordingly, the second restraining portion 52 comes into contact with the upper surface 7b of the edge 7 of the inspection target 5 and the edge 7 of the inspection target 5 is restrained in the vertical direction.

Thereafter, in a case in which the inspection target 5 is intended to be unloaded from the support unit 30 and the positioning unit 40, as illustrated in FIG. 4, the rod 54 of the cylinder 53 is moved backwards. Then, the pivot member 55 is pivoted to be spaced apart from the edge 7 of the inspection target 5, and accordingly, the second restraining portion 52 may be released from a state of restraining the upper surface 7b of the edge 7 of the inspection target 5. Also, the moving block 56 may be moved backward so as to be spaced apart from the inspection target 5, whereby the first restraining portion 51 may be released from the state of restraining the side surface 7a of the edge 7 of the inspection target 5.

As described above, according to exemplary embodiments of the present disclosure, since supporting and positioning of the inspection target are performed at one time by the positioning unit, the inspection operation may be rapidly and simply performed.

In addition, positioning of the inspection target such as a component or an assembly may be accurately and simply performed by the positioner of the positioning unit, and when a plurality of inspection targets are intended to be successively inspected, loading and unloading of the inspection targets may be rapidly and stably performed, thus significantly enhancing efficiency of the inspection operation.

The advantages and effects of the present disclosure are not limited to the aforementioned, and any other advantages and effects not described herein will be clearly understood by those skilled in the art from descriptions of claims.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An inspection apparatus comprising:
   an inspection unit for inspecting an inspection target;
   a positioning unit for supporting the inspection target and positioning the inspection target to an inspection position; and
   a restraining unit including:
      a first restraining portion restraining one edge of the inspection target in a horizontal direction of the inspection apparatus;
      a second restraining portion restraining another edge of the inspection target in a vertical direction of the inspection apparatus;
      a cylinder having a rod that moves forward and backward;
      a pivot member pivotally installed on the rod of the cylinder; and
      a moving block connected to one side of the cylinder for moving the first restraining portion, wherein the first restraining portion is attached to a side end of the moving block, and the second restraining portion is attached to a bottom end of the pivot member.

2. The inspection apparatus according to claim 1, wherein the positioning unit includes a positioner configured to support a lower surface of the inspection target and position the inspection target to the inspection position.

3. The inspection apparatus according to claim 2, wherein the positioner has a contact surface in contact with the lower surface of the inspection target, and a locating pin is provided to protrude upwardly from the contact surface.

4. The inspection apparatus according to claim 3, wherein a through hole is formed in a central portion of the contact surface of the positioner, a locating block is provided inside of the positioner, and the locating pin is coupled to the locating block.

5. The inspection apparatus according to claim 4, wherein a central line of the locating block is disposed to be identical to a central line of the positioner.

6. The inspection apparatus according to claim 5, wherein
a locating hole is formed in the inspection target to allow the locating pin to be inserted therein, and
the locating pin has a first locating pin having an outer diameter equal to an inner diameter of the locating hole of the inspection target and a second locating pin having an outer diameter smaller than the inner diameter of the locating hole of the inspection target.

7. The inspection apparatus according to claim 6, wherein a central line of the first locating pin is disposed to be identical to the central line of the locating block.

8. The inspection apparatus according to claim 6, wherein a central line of the second locating pin is disposed to be eccentric with respect to the central line of the locating block.

9. The inspection apparatus according to claim 1, further comprising:
a support unit configured to support and move the positioning unit, wherein the support unit has a support member having a flat upper surface, and the support member is moved in at least one direction in order to be adjusted to a position.

10. An inspection apparatus comprising:
a base;
an inspection unit for inspecting an inspection target, while moving in three-axis directions on the base;
a plurality of positioning units for supporting a lower surface of the inspection target and positioning the inspection target to an inspection position;
a plurality of support units for respectively moving the plurality of positioning units and supporting the plurality of positioning units; and
a restraining unit includes:
    a first restraining portion restraining one edge of the inspection target in a horizontal direction of the inspection apparatus;
    a second restraining portion restraining another edge of the inspection target in a vertical direction of the inspection apparatus;
    a cylinder having a rod that moves forward and backward, a pivot member pivotally installed on the rod of the cylinder; and
    a moving block connected to one side of the cylinder for moving the first restraining portion,
wherein the plurality of support units respectively move the plurality of positioning units in the 3-axis directions on the base, and
wherein the first restraining portion is attached to a side end of the moving block and the second restraining portion is attached to a bottom end of the pivot member.

11. The inspection apparatus according to claim 10, wherein the restraining unit is installed on the plurality of support units.

* * * * *